United States Patent
Annan et al.

(10) Patent No.: US 9,213,931 B1
(45) Date of Patent: Dec. 15, 2015

(54) MATRIX BARCODE ENHANCEMENT THROUGH CAPTURE AND USE OF NEIGHBORING ENVIRONMENT IMAGE

(71) Applicant: Sprint Communications Company L.P., Overland Park, KS (US)

(72) Inventors: Brandon C. Annan, Westwood Hills, KS (US); Joshua R. Cole, Overland Park, KS (US); Deborah M. Gilbert, Overland Park, KS (US); Dhananjay Indurkar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/607,792

(22) Filed: Jan. 28, 2015

(51) Int. Cl.
*G06K 7/10* (2006.01)
*G06K 19/06* (2006.01)
*G06K 7/14* (2006.01)
*G06F 21/10* (2013.01)
*G06F 21/62* (2013.01)

(52) U.S. Cl.
CPC ........ *G06K 19/06037* (2013.01); *G06F 21/105* (2013.01); *G06F 21/6218* (2013.01); *G06K 7/1417* (2013.01); *G06F 2221/0773* (2013.01)

(58) Field of Classification Search
CPC .......... G06K 7/1417; G06K 19/06037; G06F 21/105; G06F 21/6218; G06F 2221/0773
USPC ................ 235/454, 460, 462.01, 462.09, 494
See application file for complete search history.

(56) References Cited

U.S. PATENT DOCUMENTS

| | | | |
|---|---|---|---|
| 2011/0158470 A1* | 6/2011 | Martin et al. | 382/100 |
| 2013/0015236 A1* | 1/2013 | Porter et al. | 235/375 |
| 2013/0126619 A1* | 5/2013 | Del Fiume et al. | 235/492 |

* cited by examiner

*Primary Examiner* — Seung Lee

(57) ABSTRACT

A method of enhancing a matrix barcode with environment image. The method comprises generating, by a server, an original matrix barcode based on source information, capturing, by a camera, an image of the original matrix barcode in a graphic environment comprising the matrix barcode and at least part of the graphic environment information, and parsing the image to obtain the source information and the at least part of the graphic environment information. The method further comprises generating a key based on the at least part of the graphic environment information, encrypting the source information with the key to obtain encrypted source information, encoding the encrypted source information into a first matrix barcode, and encoding the key into a key matrix barcode.

20 Claims, 9 Drawing Sheets

MATRIX BARCODE ENHANCEMENT THROUGH CAPTURE AND USE OF NEIGHBORING ENVIRONMENT IMAGE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A matrix barcode is a two-dimensional machine-readable optical label that contains information, usually about the item to which the matrix barcode is attached. The matrix barcode may also be called a two-dimensional barcode. Different types of matrix barcode include quick response (QR) codes, ShotCodes, Semacodes, Aztec codes, code 1, MaxiCodes, and PDF417 codes. The matrix barcode may be used for the purposes of product tracking, item identification, time tracking, document management, general marketing, and much more.

SUMMARY

In an embodiment, a method of enhancing a matrix barcode with environment image is disclosed. The method comprises generating, by a server, an original matrix barcode based on source information, capturing, by a camera, an image of the original matrix barcode in a graphic environment comprising the matrix barcode and at least part of the graphic environment information, and parsing the image to obtain the source information and the at least part of the graphic environment information. The method further comprises generating a key based on the at least part of the graphic environment information, encrypting the source information with the key to obtain encrypted source information, encoding the encrypted source information into a first matrix barcode, and encoding the key into a key matrix barcode. The method further comprises transmitting, by a data store, to a user equipment the firsts matrix barcode and the key matrix barcode, scanning and decoding, by a second matrix barcode reader, the key matrix barcode being displayed on a display of the user equipment to recover the key, scanning and decoding the first matrix barcode to obtain the encrypted source information, and decrypting the encrypted source information based on the key to recover source information of the first matrix barcode.

In an embodiment, a method of verifying an enhanced matrix barcode with environment image is disclosed. The method comprises scanning and decoding, by a matrix barcode reader, a salt matrix barcode being displayed on a display of a user equipment to recover a hashing salt, scanning and decoding an original matrix barcode being displayed on the display of the user equipment to obtain enhanced source information, and determining source information and a first hash code based on the enhanced source information. The method further comprises hashing extended source information to obtain a second hash code, wherein the hashing salt is appended to the source information to obtain the extended source information, comparing the first hash code with the second hash code, and responsive to the first hash code matching the second hash code, determining that the user equipment is authorized to perform a requested service.

In an embodiment, a method of enhancing a matrix barcode with an environment image for robot use authentication and authorization is disclosed. The method comprises generating, by a robot, a first matrix barcode based on source information, capturing, by a camera of the robot, a first image of the first matrix barcode with a first face, parsing, by the robot, the first image to obtain the source information and information of the first face, and storing an authority level associated with an identity of the first face. The method further comprises capturing, by the camera of the robot, a second image of a second matrix barcode on a display of a user equipment and a second face, parsing, by the robot, the second image to obtain source information of the second matrix barcode and information of the second face, and comparing the source information of the second matrix barcode with the source information. The method further comprises comparing the information of the first face with the information of the second face, responsive to both the source information matching the source information of the second matrix barcode and the information of the first face matching the information of the second face, determining that the second face is authenticated, and determining an authority level based on the identity of the second face.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
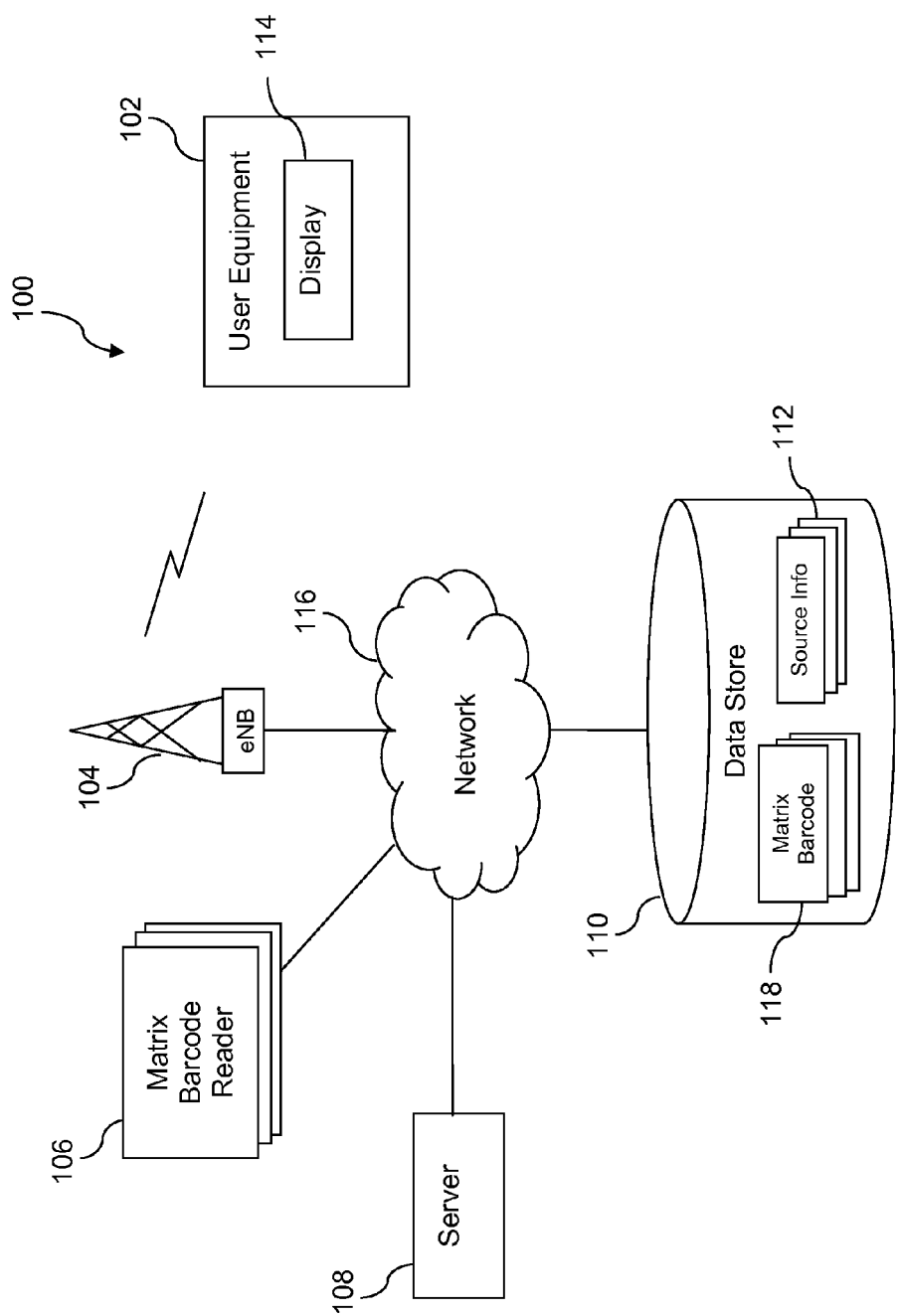
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Current matrix barcodes may present potential security risks. For example, when a matrix barcode is used for granting access to a paid service or a product, a matrix barcode may be utilized by unauthorized entities to gain access to the service or product. Enhanced matrix barcodes with more security measures may be desirable. The present disclosure teaches a system and method for enhancing matrix barcodes through capture and use of a neighboring environment image.

For example, an original matrix barcode may be generated by a server with some source information based on predefined rules. The source information may represent the semantic content of what is graphically represented by the matrix barcode. For example, the source information may be an identity of an authorized user or may be a universal reference locator (URL) that may be employed to access content via the Internet. The source information may be a digital signature or certificate of an authorized user when representing an identity of the authorized user. The source information may be said to be encoded as the original matrix barcode or transcoded as the original matrix barcode. The source information may be digital data that can be stored in an electronic memory or transmitted over wireless or wired communication links as digital data.

The server that generates the original matrix barcode may be an authentication and/or authorization server supporting a service, for example a music event, a sports event, a gym service, or another type of service. The server may generate a series of numeric, alphanumeric, or binary characters based on predefined algorithm(s), use the series of numeric, alphanumeric, or binary characters as source information, and encode the source information to be stored in a memory in an electronic representation of the original matrix barcode, for example a bitmap representation or a vector representation. The original matrix barcode may be displayed in a visual manner on a display of a user equipment through a device driver or may be printed as a label by a printer. The stored electronic or digital representation of a matrix barcode and the visually displayed matrix barcode (for example, written to a visual display by a display device driver based on reading the bitmap digital representation of the matrix barcode) may both be referred to as a matrix barcode. The original matrix barcode may be positioned in a graphic environment (e.g., among graphical elements of an environment such as in a room having furnishings and decorations), for example displayed on the display of the user equipment, and an image of the original matrix barcode and the graphic environment may be captured, for example by a camera or another type of electronic device. The camera may be part of a robot.

The image may be parsed and the source information of the original matrix barcode and the digital information of the graphic environment may be extracted from the image. The digital representation of the image of the graphic environment may comprise an ordered sequence of pixel values. The pixel values may represent grey tones or color values in each of a red, green, and blue color. Alternatively, a different digital representation of the graphic environment may be used.

At least part of the digital information of the graphic environment may be utilized to enhance the matrix barcode in a variety of manners. For example, at least part of the digital information of the graphic environment may be used to generate a key, a hashing salt, or simply stored for future reference. For example, binary representation of the graphic environment may be used to generate a key and the key may be used to encrypt the source information of the original matrix barcode. For example, a truncation of the digital representation of the graphic environment may be used to generate the key, e.g., the first or the last 64 bits of binary representation of the graphic environment may be used as the key. Alternatively, a 64 bit digital digest of the digital information of the graphic environment, a 64 bit cyclic redundancy check (CRC) of the digital information of the graphic environment, a 64 bit hash of the digital information of the graphic environment, or another type of data processing may be utilized to generate the key. Instead of 64 bit, 32 bit, 16 bit, 8 bit counterparts of the above data processing methods, another type of key generating method may be used.

Alternatively, instead of using the digital information of the graphic environment, digital information of the whole image that includes the original matrix barcode and the graphic environment may be used to enhance the matrix barcode.

The graphic environment may change at different times even at a same location, for example when the image is taken at different angles. Thus, a different key may be generated every time when a matrix barcode is generated for a service and the key may be used to encrypt the source information of the original matrix barcode. The encrypted source information may be encoded into a first matrix barcode. The key may be transcoded into a key matrix barcode. The source information, the first matrix barcode, the key, and the key matrix barcode may be transmitted by the first matrix barcode reader to a data store.

When a user of a user equipment requests the service that the server supports at a service location, the user may present the key matrix barcode and some other relevant element to a second matrix barcode reader. For example, the user may present the first matrix barcode beside the key matrix barcode. The first matrix barcode may be decoded, and encrypted source information of the first matrix barcode may be obtained. The key matrix barcode may be scanned and decoded to recover the key.

The key may be utilized to decrypt the encrypted source information of the first matrix barcode to obtain the source information of the first matrix barcode. The source information of the first matrix barcode may be transmitted to the data store. The data store may compare the source information of the first matrix barcode with a plurality of records of source information to determine whether or not the user of the user equipment is authenticated to the requested service. When the source information of the first matrix barcode matches any of the plurality of records of source information, the user of the user equipment may be determined to be authenticated to the requested service.

In another embodiment, instead of generating a key, at least part of the image of the original matrix barcode and the graphic environment may be used to generate a hashing salt, and the hashing salt may be used to hash the source information of the original matrix barcode. As known to those skilled in the art, hashing refers to numerically processing digital information according to an algorithm (i.e., a hash function) to produce a hash. Hashing transforms digital data of arbitrary size to a hash having a predefined fixed size. Some hash functions are performed using a hashing salt.

The hashed source information may be encoded into a first matrix barcode. The hashing salt may be encoded into a salt matrix barcode. The source information, the first matrix barcode, the hashing salt, and the salt matrix barcode may be transmitted by the first matrix barcode reader to a data store. When a user of a user equipment requests the service that the server supports at a service location, the user may present the first matrix barcode with the salt matrix barcode. The first matrix barcode may be decoded, and enhanced source information of the first matrix barcode may be obtained. The salt matrix barcode may be scanned and decoded to recover the hashing salt.

The source information of the first matrix barcode and a first hash code may be determined based on the enhanced source information. The hashing salt may be appended to the source information of the first matrix barcode to obtain extended source information of the first matrix barcode. The hashing salt may be utilized to hash the extended source information of the first matrix barcode to obtain a second hash code. The first and second hash codes may be compared to determine whether or not the user of the user equipment is authenticated to the requested service. When the first and second hash codes match, the user of the user equipment may be determined to be authenticated to the requested service. When authenticated to the requested service, the user equipment is granted access to the requested service. For example, the user equipment is allowed to access and/or download content for consumption on the user equipment, the user equipment is allowed to execute a remote function on a server computer providing a service, the user equipment is allowed to change a configuration of an electronic device, or the user equipment is allowed to access some other service.

In a third embodiment, a first face is positioned next to the original matrix barcode for the image. Facial recognition information of the first face may be stored for future authentication and/or authorization purposes, for example for two-factor authentication with a matrix barcode using facial recognition software. The source information of the original matrix barcode, the original matrix barcode, and/or the facial recognition information of the first face may be transmitted to a data store. When a user of a user equipment requests the service that the server supports at a service location, a user of a user equipment may position his or her face next to a fourth matrix barcode displayed on a display of the user equipment for a camera to capture a second image. This face may be referred to as a second face.

The information of the second face may be compared with the information of the first face. The source information of the fourth matrix barcode may be compared with the source information of the original matrix barcode. When both information of the second face matches information of the first face and source information of the fourth matrix barcode matches the source information of the original matrix barcode, the user of the user equipment may be determined to be authenticated to the requested service.

Thus, neighboring environment image of a matrix barcode may be utilized to generate a key or a hashing salt, or used directly (e.g. in the case of a human face) to enhance the matrix barcode to achieve a higher level of security. At least part of the neighboring environment image may be used or at least part of the combination of the neighboring environment image and the matrix barcode may be used for generating the key or hashing salt.

The above mechanisms that enhance matrix barcode may be utilized with other factors to form multi-factor authentications. For example, facial recognition information, a matrix barcode, and a graphic environment may be used for a two out of three authentication. That is to say, when two out of the three factors match a record, a user of a user equipment may be granted a requested service. As another example, facial recognition information, a matrix barcode, a graphic environment, and location data may be used for a three out of four authentication. That is to say, when three out of the four factors match a record, a user of a user equipment may be granted a requested service.

Turning now to FIG. 1, a communication system 100 is described. In an embodiment, the communication system 100 comprises a plurality of user equipments (UE) 102, a data store 110, a plurality of matrix barcode readers 106, and a server 108. The user equipment may alternatively be referred to in some contexts as a mobile communication device. The data store 110 may comprise a plurality of records of matrix barcode 118 and a plurality of records of source information 112. Source information 112 may be basic digital data and may be encoded into a stored record of matrix barcode 118. The matrix barcode 118 record may be a stored digital representation of a graphic representation of a matrix barcode, for example a bitmap file, a pixel file, a graphics interchange format (GIF) file, a tagged image file format (TIFF) file, or another type of digital representation of graphic representation of a matrix barcode. The matrix barcode 118 may be displayed in a visual manner on a display of a user equipment through a device driver or may be printed as a label by a printer. Both the stored representation of a matrix barcode or the displayed visual matrix barcode may be referred to as a matrix barcode hereinafter in the present disclosure. The matrix barcode 118 may be one of a quick response (QR) code, a ShotCode, a Semacode, an Aztec code, a code 1, a MaxiCode, a PDF417 code, or another type of matrix barcode. The user equipment 102 may comprise a display 114. The user equipment 102 may be configured to use a radio transceiver to establish a wireless communication link with an enhanced Node B (eNB) 104, and the eNB 104 may communicatively couple the UE 102 to a network 116. The eNB 104 may alternatively be referred to in some contexts as a base transceiver station (BTS). The matrix code readers 106, the server 108, and the data store 110 may also be coupled to the network 116. The network 116 may comprise any combination of private and public networks.

It is understood that the system 100 may comprise any number of user equipments 102, any number of data stores 110, any number of matrix code readers 106, any number of servers 108, and any number of eNBs 104. The collectivity of eNBs 104 may be said to comprise a radio access network, in that these eNBs 104 may provide a radio communication link to the user equipments 102 to provide access to the network 116. The radio transceiver of the user equipment 102 may communicate with the eNB 104 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol.

While a user equipment or smart phone is used in a preferred embodiment, the teachings of the present disclosure may also be extended to other mobile communication devices such as a laptop computer, a notebook computer, a tablet computer, a mobile phone, a personal digital assistant (PDA), a media player, a headset computer, a wearable computer, a game console, an Internet digital media streaming device, a television, or another network/communications capable device. In an embodiment, the user equipment 102 may have other components (not shown) such as a near field communication (NFC) radio transceiver, a short range radio transceiver such as a wireless local area network radio transceiver, or other components.

The server 108 and the data store 110 may be server computers. The server 108 and the data store 110 may be located in one computer—for example a server computer, in two different computers—for example, a server computer for the server 108 and another computer for the data store 110, in multiple different computers—for example, multiple server computers for the server 108 and other multiple computers for the data store 110, or in some other combination of computers. When the server 108 and the data store 110 are not located in one computer, the trusted server 108 and the data store 110 may share the same wired or wireless local area network.

The plurality of records of matrix barcode 118 and the plurality of records of source information 112 may be stored in the data store 110. When a user of a user equipment 102 buys, starts, and/or enrolls in a service, a corresponding data store 110 or a server computer that manages a corresponding data store 110 may generate and/or transmit to the user equipment 102 a matrix barcode 118. The matrix barcode 118 may represent a digital rights token or certificate of a service, for example a music event, a sports event, a gym service, or another type of service. The matrix barcode 118 may represent a digital rights token or certificate of a product, for example a robot. The matrix barcode 118 may be encoded based on the source information 112. The source information 112 and/or the matrix barcode 118 may be utilized to authenticate the user equipment 102 for the service, for example at a location that provides the service. Additionally or alternatively, the source information 112 and/or the matrix barcode 118 may be utilized to authorize the user equipment 102 to use the service. Enhanced versions of the matrix barcode 118 may be discussed in the present disclosure for service authentication and/or authorization.

For example, when a piece of source information 112 is encrypted with a key and then encoded into a first matrix barcode 118, for example by a matrix barcode reader 106, the piece of source information 112, the key, and/or the first matrix barcode 118 may be transmitted to the data store 110. Alternatively, the source information 112 may be encrypted and encoded by a server 108, and the piece of source information 112, the key used to encrypt the source information 112, and/or the first matrix barcode 118 may be transmitted to the data store 110. In an embodiment, the piece of source information 112 may be obtained from an image. The image may comprise the graphic environment and an original matrix barcode 118. The key may be generated based on digital information of at least part of the image or part of a graphic environment from the image. The original matrix barcode 118 may have been encoded based on the source information 112.

For example, the image may have been captured of the original matrix barcode 118 placed in a graphic environment. For example, the image includes both the original matrix barcode 118 and visible items proximate to the original matrix barcode 118. Digital information of the image may be extracted, for example source information 112 of the original matrix barcode 118 and/or digital information of the graphic environment or the whole image. At least part of the digital information of the graphic environment may be utilized to generate a key, and the key may be utilized to encrypt the source information 112. Alternatively, at least part of the digital information of the whole image may be utilized to generate a key, and the key may be utilized to encrypt the source information 112. The key may also be encoded into the key matrix barcode 118 and the key matrix barcode may be transmitted to the data store 110 besides the key, the piece of source information 112, and/or the original matrix barcode 118. The data store 110 may create a record for the source information 112. The data store 110 may store the key, the source information 112, the original matrix barcode 118, and/or the first and key matrix barcodes 118 in corresponding fields of the source information record.

In a second example where source information 112 is hashed with a hashing salt and then encoded into a first matrix barcode 118, the source information 112, the hashing salt, and/or the first matrix barcode 118 may be transmitted to the data store 110. Alternatively, the source information 112 may be hashed and encoded by a server 108, and the piece of source information 112, the hashing salt used to hash the source information 112, and/or the first matrix barcode 118 may be transmitted to the data store 110. In an embodiment, the hashing salt may be obtained from an image. The hashing salt may be generated based on digital information of at least part of the image or at least part of a graphic environment from the image of the graphic environment and an original matrix barcode. The original matrix barcode 118 may have been encoded based on the source information 112.

For example, the image may have been captured of the original matrix barcode 118 placed in a graphic environment. Digital information of the image may be extracted, for example source information 112 of the original matrix barcode 118 and/or digital information of the graphic environment or the whole image. At least part of the digital information of the graphic environment may be utilized to generate a hashing salt, and the hashing salt may be utilized to hash the source information 112. Alternatively, at least part of the digital information of the whole image may be utilized to generate a hashing salt, and the hashing salt may be utilized to hash the source information 112. The hashing salt may also be encoded into a salt matrix barcode 118, and the salt matrix barcode may be transmitted to the data store 110 besides the hashing salt, the piece of source information 112, and/or the original matrix barcode 118. The data store 110 may create a record for the source information 112 and store the received hashing salt, the source information 112, the original matrix barcode 118, the first matrix barcode 118, and/or the salt matrix barcode 118 in corresponding fields of the source information record.

In a third example where source information 112 is encoded into a matrix barcode 118 and information of a face placed beside the matrix barcode 118 in a captured image is also used for authentication and/or authorization, the source information 112, the matrix barcode 118, and/or the facial recognition information of the face may be transmitted to the data store 110. The data store 110 may create a record for the source information 112 and store the received source information, the matrix barcode 118, and/or the facial recognition information in corresponding fields of the source information record. For example, the source information 112 may be encoded into a matrix barcode 118, and an image may be captured of the matrix barcode 118 placed next to the face, for example by displaying the matrix barcode 118 on a display of an electronic device. Digital information of the image may be extracted, for example the source information of the matrix barcode 118 and/or facial recognition information of the face.

The facial recognition information of the face may be utilized with the matrix barcode 118 in a two-factor authentication and/or authorization manner to determine whether or not to grant some requested service. For example, when a user of a user equipment 102 requests for service at a service location, the user may provide a matrix barcode 118 displayed on a display of the user equipment 102 and a face, a camera at the location may capture an image of the displayed matrix barcode 118 and the face. Digital information may be extracted, for example by the camera or another electronic device, from the image to obtain source information of the displayed matrix barcode 118 and digital information of the face. When the source information 112 from the displayed matrix barcode 118 matches any of the plurality of records of source information 112 in the data store 110 and when the information of the provided face matches any of the records of facial recognition information in the data store 110, the user of the user equipment 102 may be determined to be authenticated to the requested service.

Figure 2A:
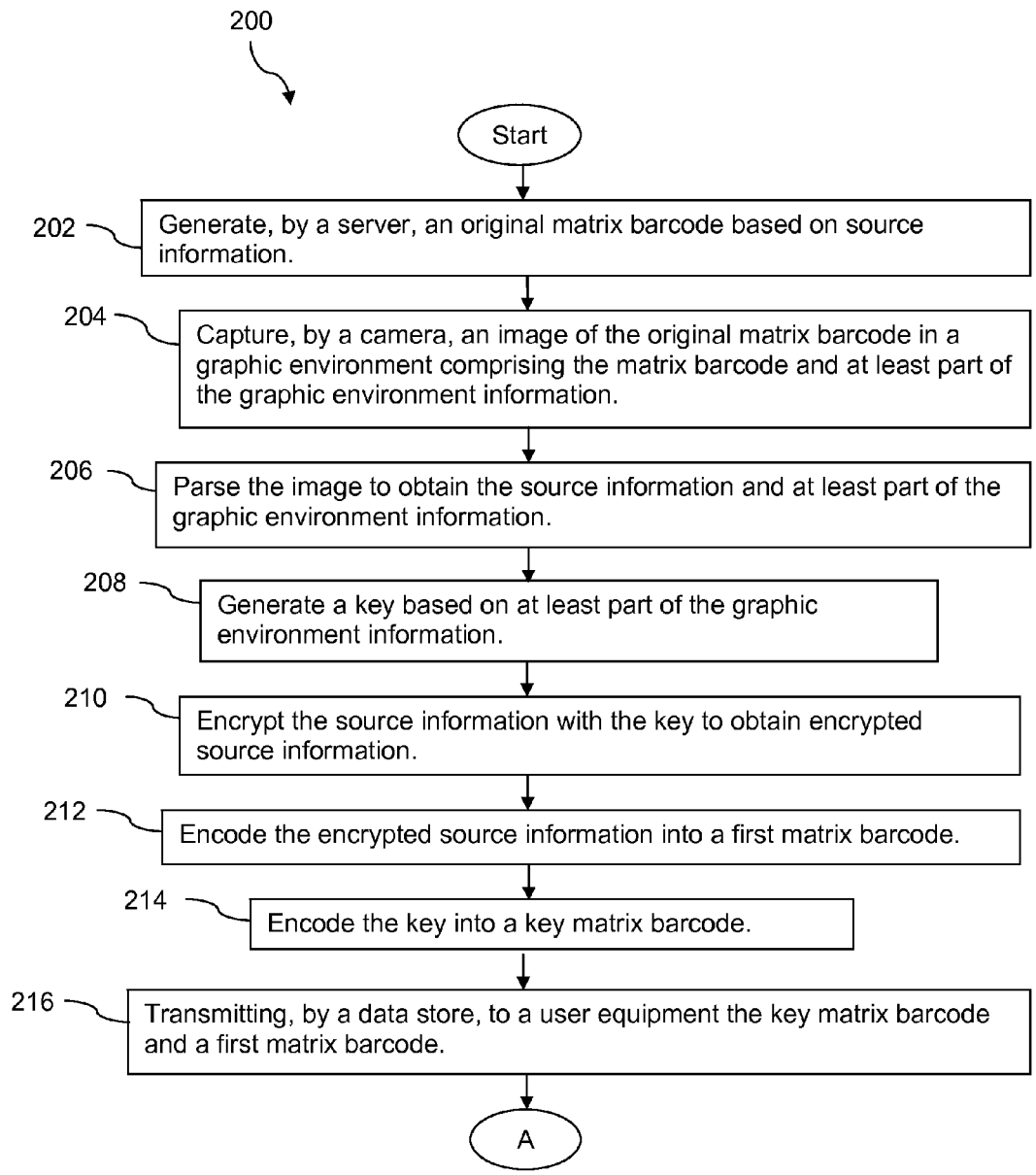
FIG. 2A and FIG. 2B is a flow chart illustrating a method according to an embodiment of the disclosure.
Figure 2B:
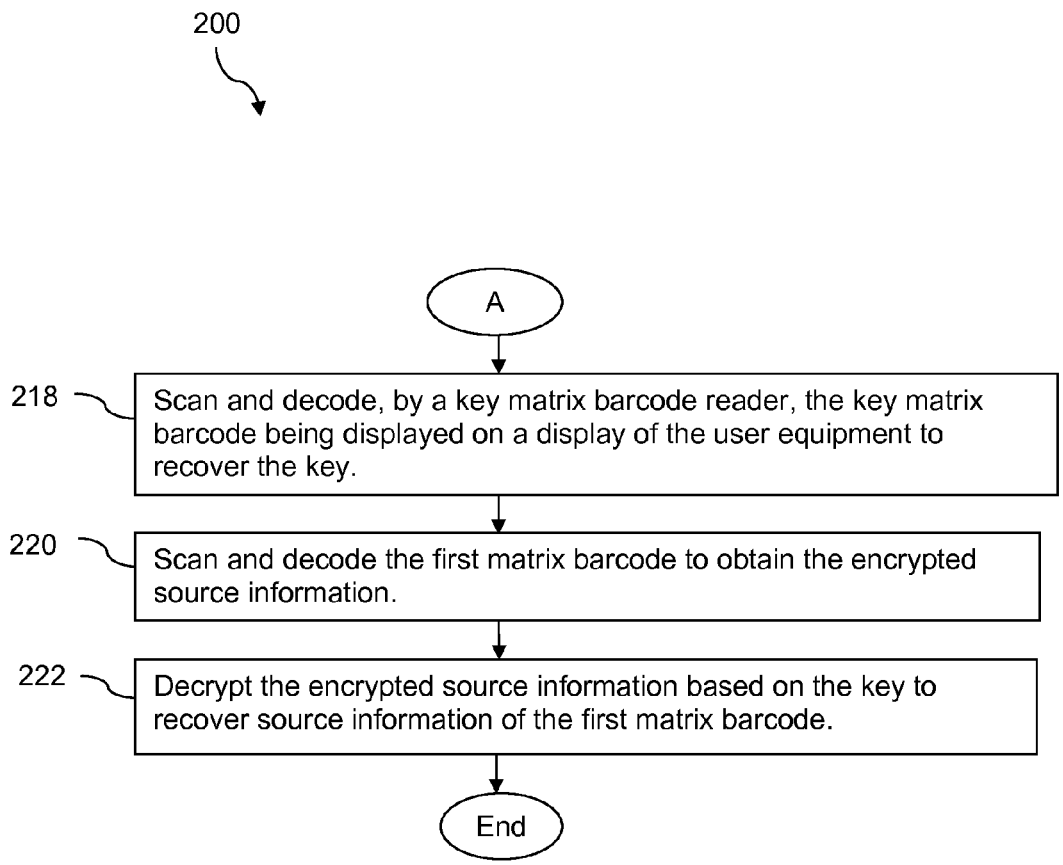

Turning now to FIGS. 2A and 2B, a method 200 is described. At block 202, an original matrix barcode is generated by a server based on source information. For example, the server 108 may be an authentication and/or authorization server supporting a service, for example a music event, a sports event, a gym service, or another type of service. The server 108 may be an authentication and/or authorization server supporting a product, for example a robot. The server 108 may generate an original matrix barcode 118 with some source information 112 based on predefined rules. For example, the server 108 may generate a series of alphanumeric characters based on predefined algorithm(s), use the series of alphanumeric characters as source information 112, and encode the source information 112 into the original matrix barcode 118. The source information 112 may be utilized to authenticate and/or authorize a user of a user equipment 102 to the service that the server 108 supports. The source information 112 may be utilized to authenticate and/or authorize a user of a user equipment 102 to the product that the server 108 supports.

At block 204, an image is captured by a camera of the original matrix barcode in a graphic environment comprising the matrix barcode and at least part of the graphic environment information. For example, a camera may capture an image of the original matrix barcode 118, for example on a display of an electronic device, in a graphic environment. The camera may be part of a robot. The image may comprise the matrix barcode 118 and at least part of the graphic environment. In an embodiment, information of the graphic environment may comprise a color of the graphic environment. In another embodiment, information of the graphic environment may comprise a face.

At block 206, the image is parsed to obtain the source information and at least part of the graphic environment information. For example, the camera or another electronic device may parse the image to obtain the source information 112 and at least part of the graphic environment information. For example, the image may be processed by an electronic device, the server 108, or another server computer. The image may be processed and information of the original matrix barcode 118 and at least part of the graphic environment may be extracted. Source information of the original matrix barcode 118 may be obtained. Information, for example binary representation, of at least part of the graphic environment may be extracted. At block 208, a key is generated based on at least part of the graphic environment information. For example, a key may be generated by a first matrix barcode reader 106 based on the binary representation of at least part of the graphic environment information.

At block 210, the source information is encrypted with the key to obtain encrypted source information. For example, the source information 112 may be encrypted by the first matrix barcode reader 106 with the key to obtain encrypted source information. Alternatively, the source information 112 may be encrypted by the server 108 or another server computer with the key to obtain the encrypted source information. At block 212, the encrypted source information is encoded into a first matrix barcode. For example, the encrypted source information may be encoded, for example by the first matrix barcode reader 106 or the server 108, into a first matrix barcode 118.

At block 214, the key is encoded into a key matrix barcode. For example, the key may be encoded into a key matrix barcode 118 by the first matrix barcode reader 106 or the server 108. The first and/or the key matrix barcodes 118 may be transmitted by the first matrix barcode reader 106 or the server 108 to the data store 110. The source information 112 and/or the key may be transmitted to the data store 110. The source information 112 of the first matrix barcode 118, the key, the first matrix barcode 118, and/or the key matrix barcode 118 may be stored in corresponding fields of a record among the plurality of records for source information 112 in the data store 110. Please note that the source information 112 of the first matrix barcode 118 may be the same as the source information 112 of the original matrix barcode 118.

At block 216, the key matrix barcode and the first matrix barcode are transmitted by a data store to a user equipment. For example, when a user equipment 102 requests a service at a second matrix barcode reader 106 that is supported by the server 108, a display of the user equipment 102 may display two matrix barcodes 118, the key matrix barcode 118 and the first matrix barcode 118. The key and first matrix barcodes 118 may have been transmitted by the data store 110 earlier to the user equipment 102, for example when a user of the user equipment 102 buys, starts, or enrolls in the service requested.

At block 218, the key matrix barcode being displayed on a display of the user equipment is scanned and decoded by a second matrix barcode reader to recover the key. For example, the second matrix barcode reader 106 may scan the key matrix barcode 118 being displayed on the display of the user equipment 102. The second matrix barcode reader 106 may decode the key matrix barcode 118 to recover the key. At block 220, the first matrix barcode is scanned and decoded to obtain the encrypted source information. For example, the second matrix barcode reader 106 may scan the first matrix barcode 118 and may decode it to obtain the encrypted source information. At block 222, the encrypted source information is decrypted based on the key to recover source information of the first matrix barcode. For example, the second matrix barcode reader 106 may further decrypt the encrypted source information based on the key to recover source information 112 of the first matrix barcode 118.

The source information 112 of the first matrix barcode 118 may be transmitted by the second matrix barcode reader 106 to the data store 110. The source information 112 of the first matrix barcode 118 may be compared by the data store 110 with the plurality of records of source information 112. When any of the plurality of records of the source information 112 matches the source information 112 of the first matrix barcode 118, the user equipment 102 may be determined to be authenticated to perform the requested service. Otherwise, the user equipment 102 may be determined to be not authenticated to and may not have the requested service performed. This is the first example of enhancing a matrix barcode 118— to generate a key based on at least part of a graphic environment to encrypt source information 112 of a matrix barcode 118, as discussed earlier in the present disclosure.

Figure 3:
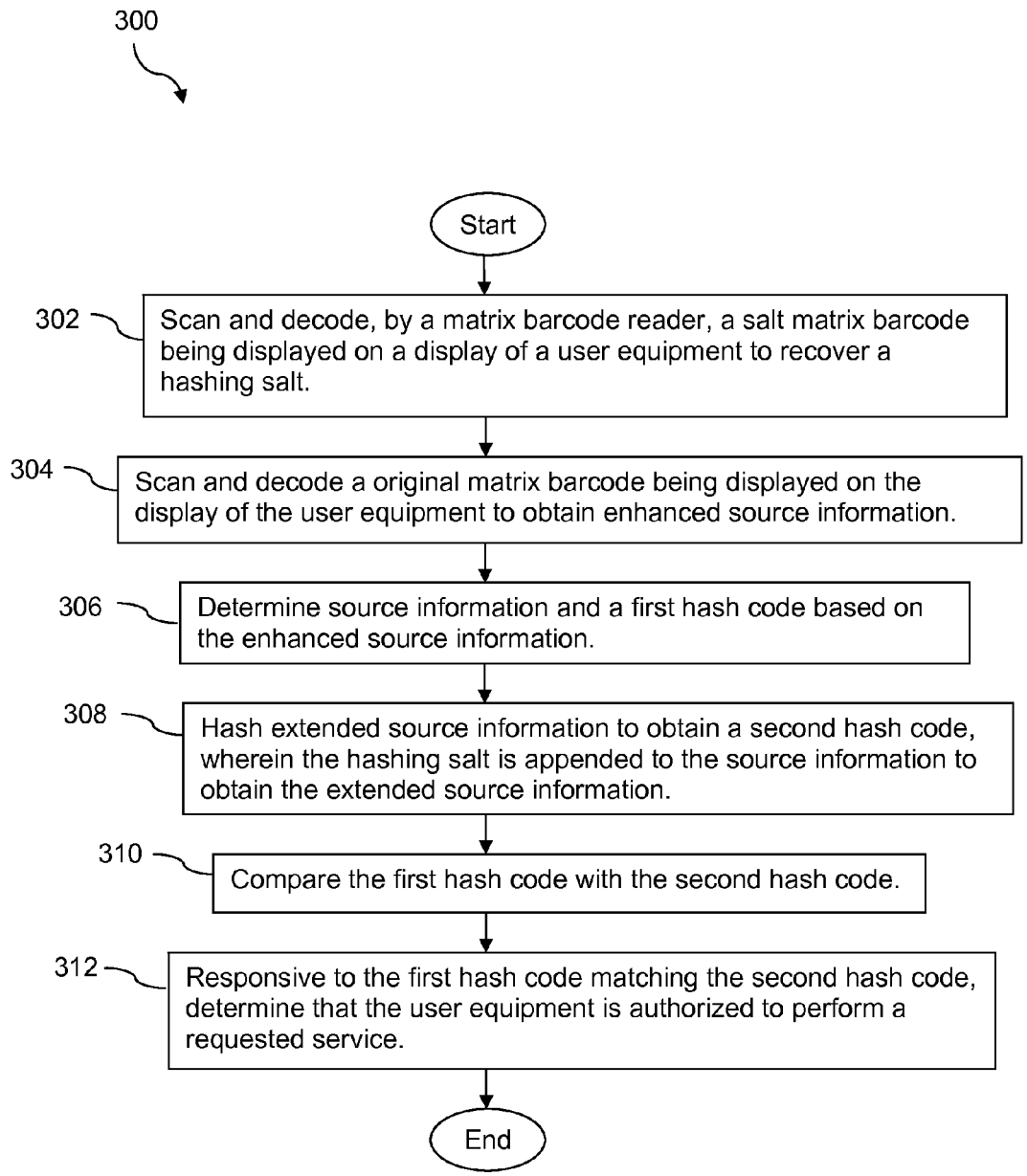
FIG. 3 is a flow chart illustrating another method according to an embodiment of the disclosure.

Turning now to FIG. 3, a method 300 is described. This is the second example of enhancing a matrix barcode 118: to use a hashing salt generated from at least part of a graphic environment to hash source information of a matrix barcode 118, as discussed earlier in the present disclosure. For example, the server 108 may generate a first matrix barcode 118 based on the source information 112. The source information may be a series of alphanumeric characters generated earlier by the server 108 based on predefined algorithm(s). A camera may capture an image of the first matrix barcode 118 in a graphic environment. Both the first matrix barcode 118 and information of at least part of the graphic environment may be captured in the image. The camera may parse the image to obtain the source information 112 and/or the information of at least part of the graphic environment. A hashing salt may be generated by the camera or a second matrix barcode reader 106 based on the information of at least part of the graphic environment.

The hashing salt may be appended by the second matrix barcode reader 106 to the source information 112 to obtain an extended source information. The extended source information may be hashed by the second matrix barcode reader 106 with the hashing salt to obtain a first hash code. The second matrix barcode reader 106 may append the first hash code to the source information 112 to obtain enhanced source information. The second matrix barcode reader 106 may encode the enhanced source information into an original matrix barcode. The second matrix barcode reader 106 may further encode the hashing salt into a salt matrix barcode. The original and salt matrix barcodes 118 may be transmitted by the second matrix barcode reader 106 to a user equipment 102.

At block 302, the salt matrix barcode being displayed on a display of a user equipment is scanned and decoded by a matrix barcode reader to recover a hashing salt. For example, when the user equipment 102 requests a service at a first matrix barcode reader 106 that is supported by the server 108, a display of the user equipment 102 may display two matrix barcodes 118, a salt matrix barcode 118 and the original matrix barcode 118. The salt and original matrix barcodes 118 may have been transmitted by the data store 110 earlier to the user equipment 102, for example when a user of the user equipment 102 buys, starts, or enrolls in the service requested. The salt matrix barcode 118 may be scanned and/or decoded by the first matrix barcode reader 106 to recover the hashing salt.

At block 304, the original matrix barcode being displayed on the display of the user equipment is scanned and decoded to obtain enhanced source information. For example, the original matrix barcode 118 may be scanned and/or decoded by the second matrix barcode reader 106 to obtain enhanced source information of the original matrix barcode 118. At block 306, source information and the first hash code are determined based on the enhanced source information. For example, source information 112 of the original matrix barcode 118 and the first hash code may be determined by the second matrix barcode reader 106 based on the enhanced source information. For example, based on predefined hash rules and/or formats, the enhanced source information may have a first part and a second part. The first part may be determined to be the source information 112 and the second part maybe determined to be the first hash code.

At block 308, extended source information is hashed to obtain a second hash code, wherein the hashing salt is appended to the source information 112 to obtain the extended source information. At block 310, the first hash code is compared with the second hash code. For example, the first hash code may be compared by the second matrix barcode reader 106 with the second hash code. At block 312, responsive to the first hash code matching the second hash code, it is determined that the user equipment is authorized to perform a requested service. For example, when the first hash code is determined by the second matrix barcode reader 106 to match the second hash code, the user equipment 102 may be determined to be authorized and/or authenticated to perform the requested service. An authority level of a user of the user equipment 102 for the requested service may be determined by the second matrix barcode reader 106 based on at least one of location data of the user equipment 102, an internet protocol (IP) address of the user equipment 102, or another type of relevant information. When the user requests to program or reprogram a robot, a variety of programming choices may be determined based on at least one of location data of the user equipment 102, an internet protocol (IP) address of the user equipment 102, or another type of relevant information. On the other hand, when the first hash code does not match the second hash code, the user equipment 102 may be determined to be not authorized and/or authenticated to perform the requested service.

Figure 4:
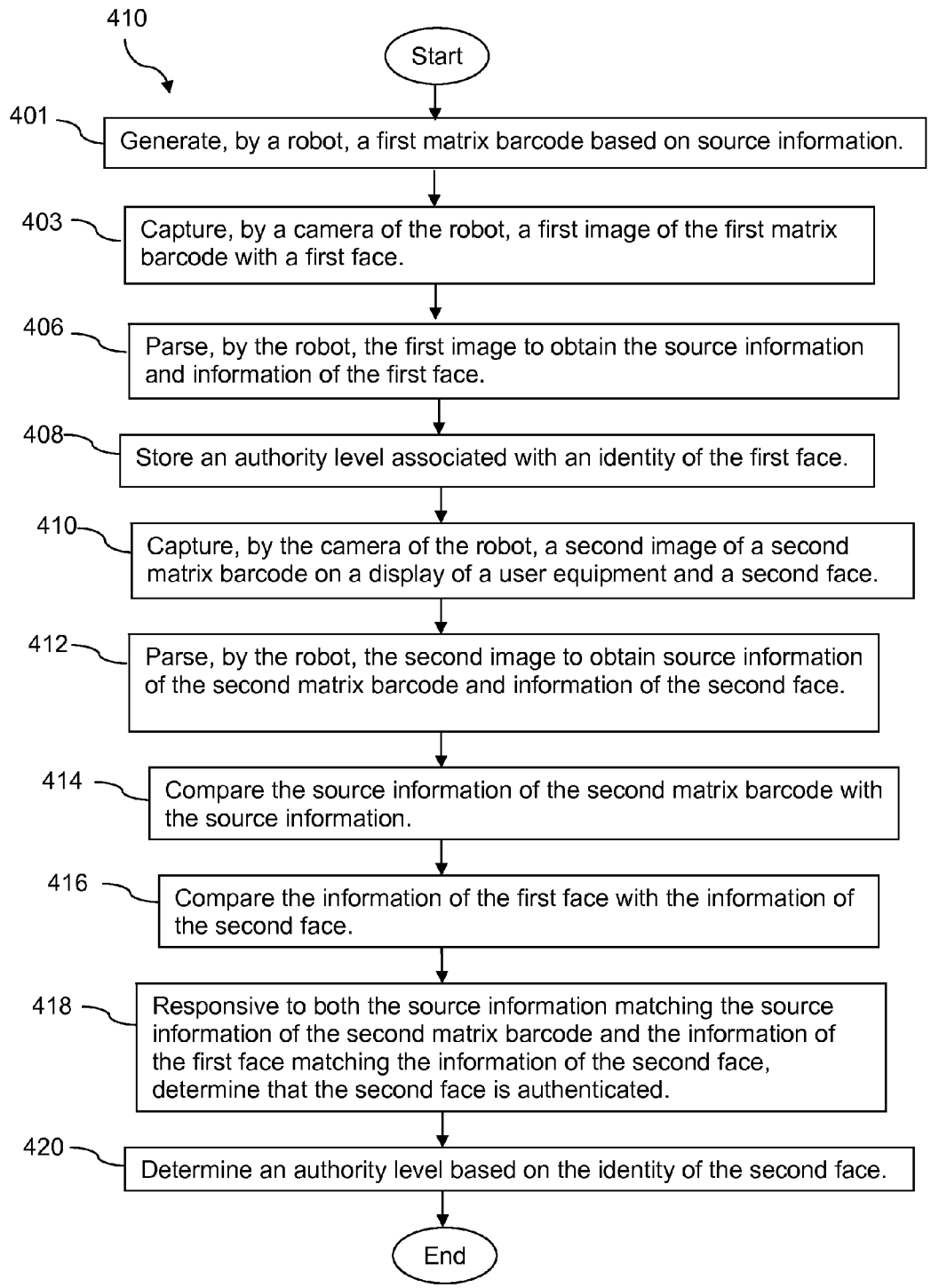
FIG. 4 is a flow chart illustrating a third method according to an embodiment of the disclosure.

Turning now to FIG. 4, a method 410 is described. This is the third example of enhancing a matrix barcode 118: to use both a matrix barcode 118 and a face next to the matrix barcode 118 for two-factor authentication, as discussed earlier in the present disclosure. At block 401, a first matrix barcode is generated by a robot based on source information. For example, a robot may generate a first matrix barcode 118 based on some source information 112. For example the server 108 or the robot may generate a series of alphanumeric characters based on predefined algorithm(s), use the series of alphanumeric characters as source information 112, and encode the source information 112 into the first matrix barcode 118. At block 403, a first image of the first matrix barcode with a first face is captured by a camera of the robot. For example, a matrix barcode reader 106 or a camera of the robot may capture a first image of the first matrix barcode 118 with a first face, for example a human face. For example, a person may position a user equipment 102 displaying the first matrix barcode 118 on a display of the user equipment 102 next to his or her face and the camera of the robot may take a picture of the first matrix barcode 118 and the face.

At block 406, the first image is parsed by the robot to obtain the source information and information of the first face. For example, the robot may parse the first image to obtain the source information 112 and/or facial recognition information of the first face. At block 408, an authority level associated with an identity of the first face is stored. For example, the robot may store an authority level associated with an identity of the first face, for example in the data store 110, in the robot itself, or both. Thus, a plurality of faces may be stored, each corresponding to an individual authority level or a group of faces corresponding to an individual authority level. The source information 112, the first matrix barcode 118, and/or the information of the first face may be stored by the robot. The source information 112, the first matrix barcode 118, and/or the information of the first face may be transmitted by the robot to be stored in the data store 110. A plurality of records of source information 112, a plurality of records of matrix barcodes 118, and/or corresponding information of faces may be stored in the data store 110, for example for authentication and/or authorization purposes.

At block 410, a second image is captured by the camera of the robot of a second matrix barcode on a display of a user equipment and a second face. For example, the camera of the robot may capture a second image of a second matrix barcode 118 on a display of a user equipment 102 and a second face. The second image may be captured by the robot when the user equipment 102 requests a service at the robot. At block 412, the second image is parsed by the robot to obtain source information 112 of the second matrix barcode 118 and information of the second face.

At block 414, the source information of the second matrix barcode is compared with the source information. For example, the robot may compare the source information 112 of the second matrix barcode 118 with the source information 112 that the robot stored. When a plurality of pieces of source information 112 is stored by the robot, the source information 112 of the second matrix barcode 118 may be compared with the stored plurality of pieces of source information 112. At block 416, the information of the first face is compared with the information of the second face. For example, the robot may also compare the facial recognition information of the first face that is stored by the robot with the facial recognition information of the second face. When information of a plurality of faces is stored by the robot, the facial recognition information of the second face may be compared with the stored facial recognition information of a plurality of faces. The robot may transmit the source information 112 of the second matrix barcode 118 and/or the facial recognition information of the second face to the data store 110 for the data store 110 to verify the authentication of the second face.

At block 418, responsive to both the source information matching the source information of the second matrix barcode and the information of the first face matching the information of the second face, determine that the second face is authenticated. For example, when both the source information 112 matches the source information 112 of the second matrix barcode 118 and the information of the first face matches the information of the second face, the second face may be determined to be authenticated by the robot, for example to perform the requested service. Alternatively, when both the source information 112 of the second matrix barcode 118 matches any of the stored plurality of pieces of source information 112 and the information of the second face matches information of any of the stored faces, the second face may be determined to be authenticated by the robot. Otherwise, the second face may be determined to be not authenticated and may not have the robot perform any requested service.

At block 420, an authority level is determined based on the identity of the second face. For example, different authority levels may correspond to different sets of activities that the robot can be ordered to perform and an authority level may be determined based on the identity of the second face. For example, a mom in a family may have an authority level of having the robot clean the house, kids may have an authority level of having the robot tell stories, and a dad in a family may have an authority level of having the robot change car oil.

When a repairman displays a corresponding third matrix barcode 118 beside a fourth matrix barcode 118 without displaying a face beside the fourth matrix barcode 118 and when the fourth matrix barcode is determined to match the first matrix barcode, the repairman may be determined to be authorized to configure, reconfigure, program, and/or reprogram the robot if the third matrix barcode 118 matches any of a pool of matrix barcodes 118 with configuration authority. The third matrix barcode 118 may be generated based on a rolling algorithm. The third matrix barcode may comprise configuration information for the robot. Alternatively, the third matrix barcode may comprise a link for the robot to download configuration information from.

Figure 5:
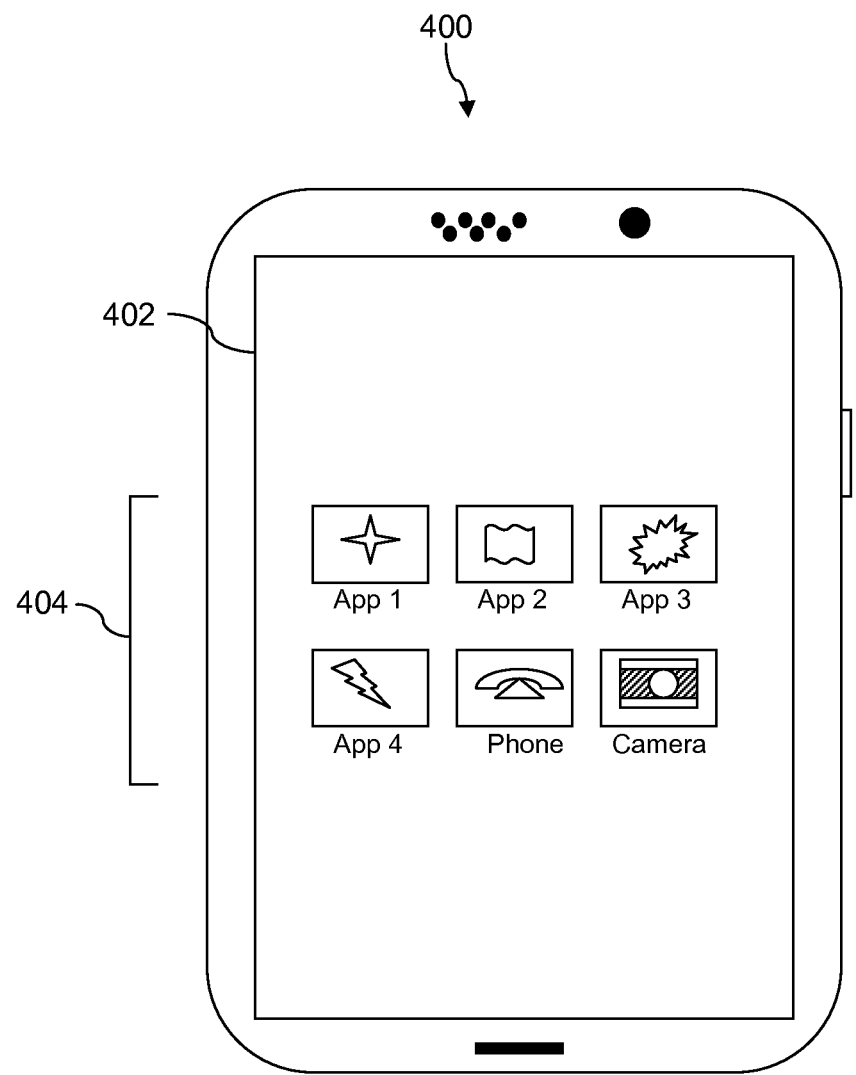
FIG. 5 is an illustration of a user equipment according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
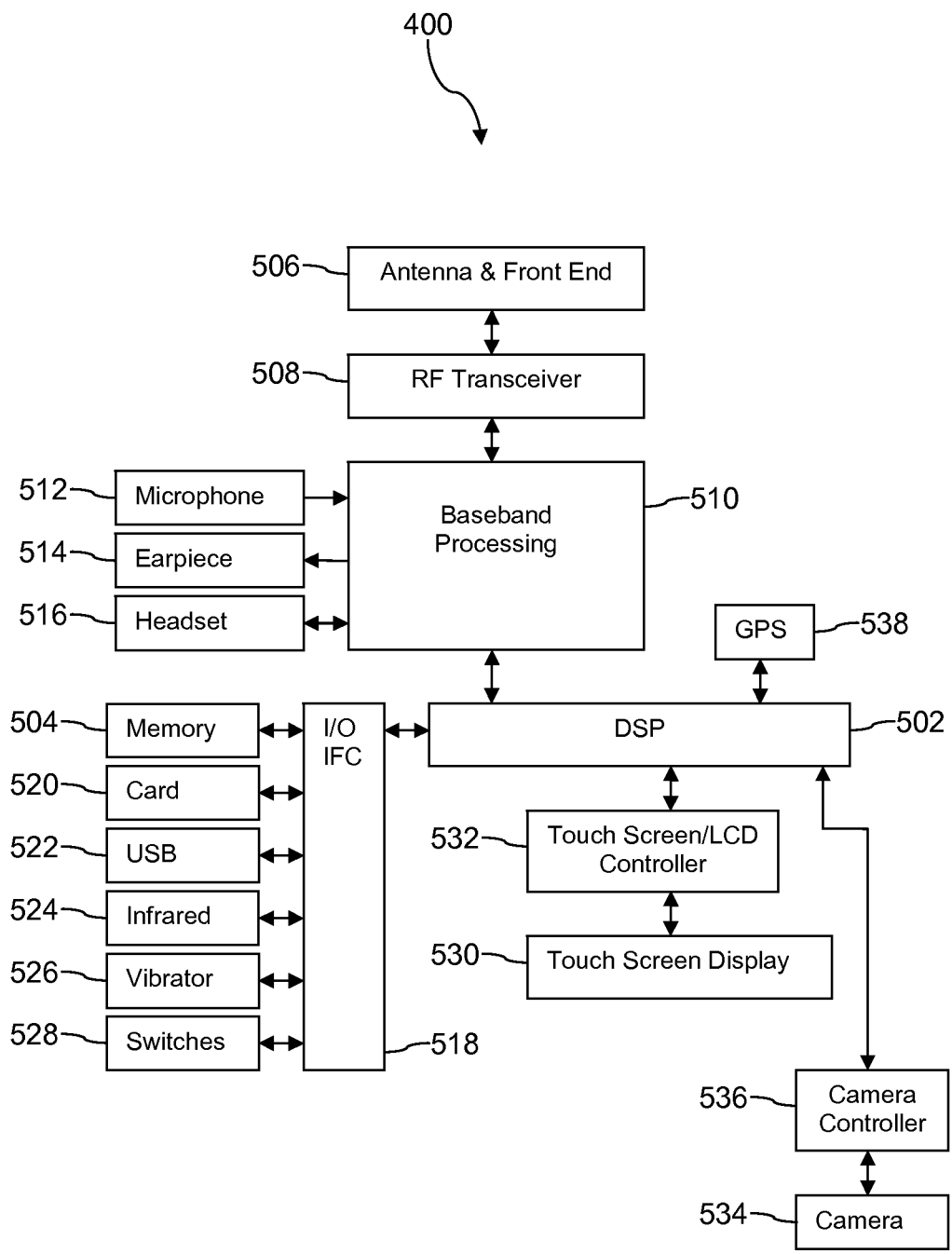
FIG. 6 is a block diagram of a user equipment according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
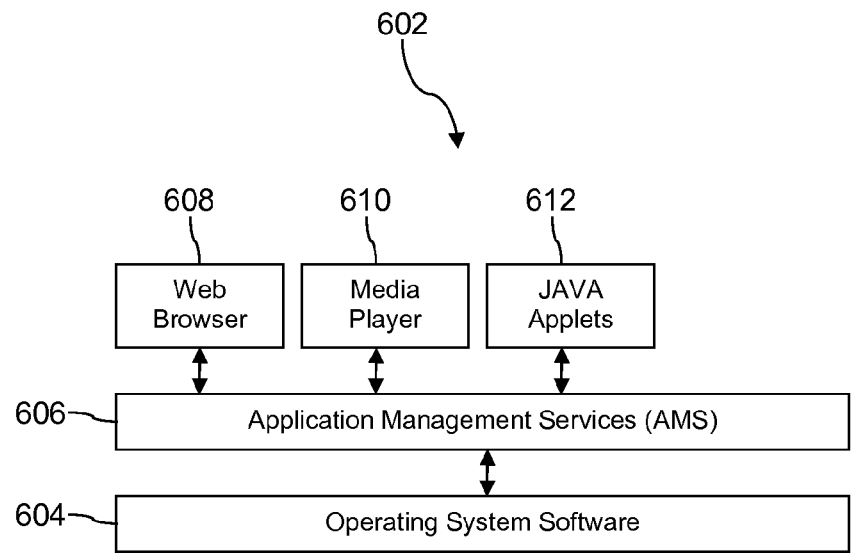
FIG. 7A is a block diagram of a software architecture of a user equipment according to an embodiment of the disclosure.

7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the user equipment 400. Also shown in FIG. 7A are a web browser application 608, a media player application 610, and JAVA applets 612. The web browser application 608 may be executed by the user equipment 400 to browse content and/or the Internet, for example when the user equipment 400 is coupled to a network via a wireless link. The web browser application 608 may permit a user to enter information into forms and select links to retrieve and view web pages. The media player application 610 may be executed by the user equipment 400 to play audio or audiovisual media. The JAVA applets 612 may be executed by the user equipment 400 to provide a variety of functionality including games, utilities, and other functionality.

Figure 7B:
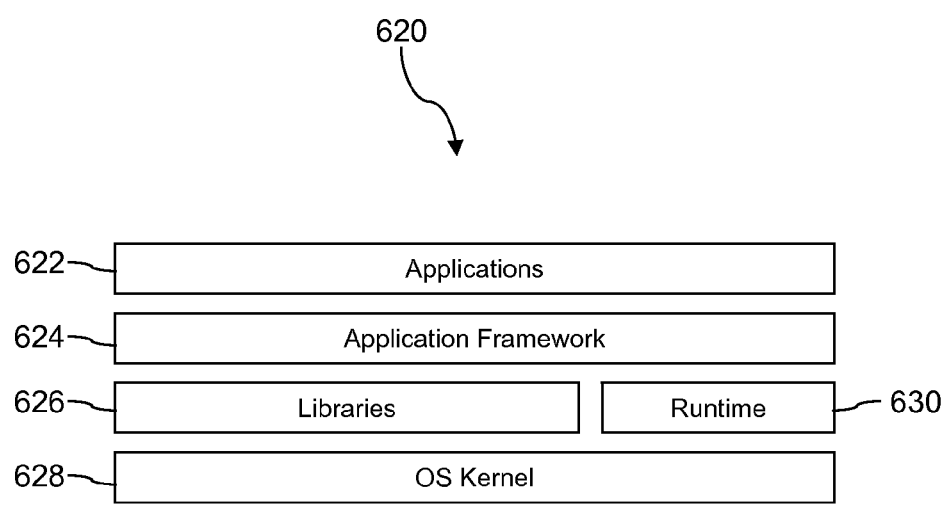
FIG. 7B is a block diagram of another software architecture of a user equipment according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
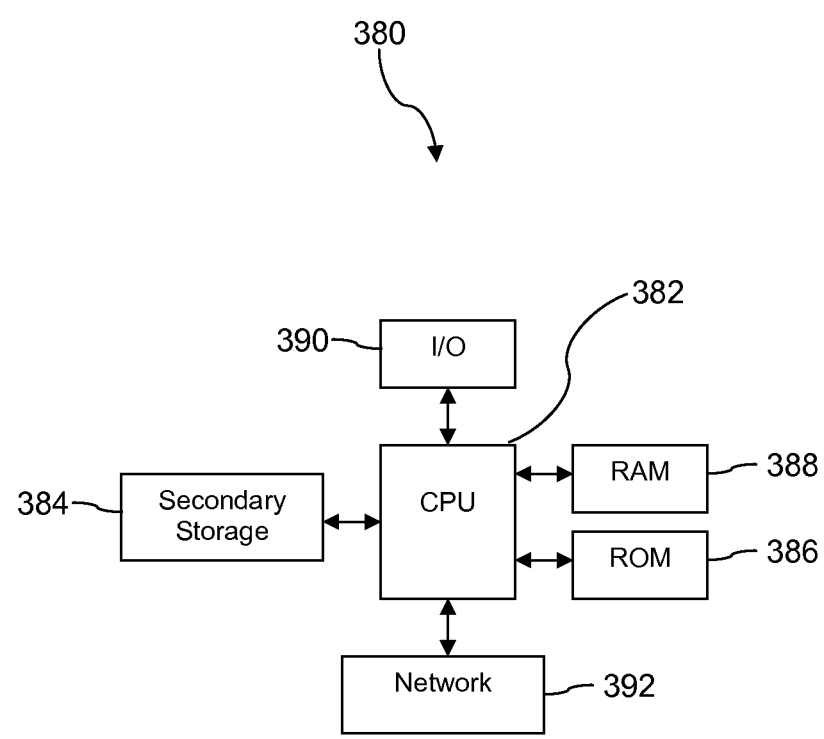
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of enhancing a matrix barcode with environment image, comprising:
    generating, by a server, an original matrix barcode based on source information;
    capturing, by a camera, an image of the original matrix barcode in a graphic environment comprising the matrix barcode and at least part of graphic environment information;
    parsing the image to obtain the source information and the at least part of the graphic environment information;
    generating a key based on the at least part of the graphic environment information;
    encrypting the source information with the key to obtain encrypted source information;
    encoding the encrypted source information into a first matrix barcode;
    encoding the key into a key matrix barcode;
    transmitting, by a data store, to a user equipment the first matrix barcode and the key matrix barcode;
    scanning and decoding, by a second matrix barcode reader, the key matrix barcode being displayed on a display of the user equipment to recover the key;
    scanning and decoding the first matrix barcode to obtain the encrypted source information; and
    decrypting the encrypted source information based on the key to recover the source information of the first matrix barcode.

2. The method of claim 1, further comprising, transmitting, by the server, the first matrix barcode and the key matrix barcode to the data store, wherein the source information of the first matrix barcode is stored in a record of a plurality of records for source information in the data store.

3. The method of claim 2, further comprising, transmitting, by the second matrix barcode reader, the source information of the first matrix barcode to the data store.

4. The method of claim 3, further comprising, comparing, by the data store, the source information of the first matrix barcode with the plurality of records of source information.

5. The method of claim 4, wherein when any of the plurality of records of the source information matches the source information of the first matrix barcode, the user equipment is determined to be authorized to perform a requested service.

6. The method of claim 1, wherein the graphic environment information comprises a color of the graphic environment.

7. The method of claim 1, wherein the graphic environment information comprises a visible face.

8. The method of claim 1, wherein the matrix barcode is one of a quick response (QR) code, a ShotCode, a Semacode, an Aztec code, a code 1, a MaxiCode, or a PDF417 code.

9. A method of verifying an enhanced matrix barcode with environment image, comprising:
    scanning and decoding, by a matrix barcode reader, a salt matrix barcode being displayed on a display of a user equipment to recover a hashing salt;
    scanning and decoding an original matrix barcode being displayed on the display of the user equipment to obtain enhanced source information;
    determining source information and a first hash code based on the enhanced source information;
    hashing extended source information to obtain a second hash code, wherein the hashing salt is appended to the source information to obtain the extended source information;
    comparing the first hash code with the second hash code; and
    responsive to the first hash code matching the second hash code, determining that the user equipment is authorized to perform a requested service.

10. The method of claim 9, further comprising:
    generating, by a server, a first matrix barcode based on the source information;
    capturing, by a second matrix barcode reader, an image of the first matrix barcode in a graphic environment comprising the first matrix barcode and at least part of graphic environment information;
    parsing, by the second matrix barcode reader, the image to obtain the source information and the at least part of the graphic environment information;
    generating the hashing salt based on the at least part of the graphic environment information;
    hashing the extended source information to obtain the first hash code, wherein the hashing salt is appended to the source information to obtain the extended source information;
    appending the first hash code to the source information to obtain the enhanced source information;
    encoding the enhanced source information into the original matrix barcode;
    encoding the hashing salt into the salt matrix barcode; and
    transmitting to the user equipment the original and salt matrix barcodes.

11. The method of claim 9, further comprising, determining an authority level of a user of the user equipment for the requested service based on at least one of location data of the user equipment or an internet protocol (IP) address of the user equipment.

12. The method of claim 9, wherein the user equipment is one of a laptop computer, a notebook computer, a tablet computer, a mobile phone, a personal digital assistant (PDA), a media player, a headset computer, a wearable computer, a game console, an Internet digital media streaming device, a television, or another network/communications capable device.

13. The method of claim 9, wherein the user equipment establishes a wireless communication with a radio access network according to a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

14. A method of enhancing a matrix barcode with environment image for robot use authentication and authorization, comprising:
generating, by a robot, a first matrix barcode based on source information;
capturing, by a camera of the robot, a first image of the first matrix barcode with a first face;
parsing, by the robot, the first image to obtain the source information and information of the first face;
storing an authority level associated with an identity of the first face;
capturing, by the camera of the robot, a second image of a second matrix barcode on a display of a user equipment and a second face;
parsing, by the robot, the second image to obtain source information of the second matrix barcode and information of the second face;
comparing the source information of the second matrix barcode with the source information;
comparing the information of the first face with the information of the second face;
responsive to both the source information matching the source information of the second matrix barcode and the information of the first face matching the information of the second face, determining that the second face is authenticated; and
determining an authority level based on an identity of the second face.

15. The method of claim 14, wherein when a repairman displays a corresponding third matrix barcode beside a fourth matrix barcode without displaying a face beside the fourth matrix barcode and when the fourth matrix barcode is determined to match the first matrix barcode, the repairman is authorized to configure the robot.

16. The method of claim 15, wherein the third matrix barcode is generated based on a rolling algorithm.

17. The method of claim 15, wherein the third matrix barcode comprises configuration information.

18. The method of claim 15, wherein the third matrix barcode comprises a link for the robot to download configuration information from.

19. The method of claim 14, further comprising, transmitting the source information and the information of first face to a data store.

20. The method of claim 14, wherein different authority levels correspond to different sets of activities that can be performed by the robot.

* * * * *